United States Patent [19]

Seha et al.

[11] 3,928,395

[45] Dec. 23, 1975

[54] PROCESS FOR THE NITRATION OF AROMATIC COMPOUNDS

[75] Inventors: Zdenek Seha, Basel; Tibor Somlo, Birsfelden, both of Switzerland

[73] Assignee: Ciba-Geigy AG, Basel, Switzerland

[22] Filed: Sept. 26, 1973

[21] Appl. No.: 400,758

[30] Foreign Application Priority Data

Oct. 5, 1972 Switzerland.................... 14563/72
Dec. 6, 1972 Switzerland.................... 17767/72

[52] U.S. Cl. ............... 260/369; 260/352; 260/357; 260/359; 260/360; 260/362; 260/370; 260/371; 260/376; 260/384; 260/396 R; 260/471 R; 260/556 AR; 260/607 R; 260/645; 260/646; 260/688

[51] Int. Cl.² ........................................ C07C 79/37

[58] Field of Search .......... 260/370, 371, 369, 622, 260/688, 645, 352, 357, 359, 360, 367, 471 R, 396 R

[56] References Cited

UNITED STATES PATENTS

| 2,435,314 | 2/1948 | Kokatnur | 260/645 |
| 3,798,243 | 3/1974 | Toth | 260/369 |
| 3,836,547 | 9/1974 | Toth | 260/369 |
| 3,836,601 | 9/1974 | Frey et al. | 260/369 |

*Primary Examiner*—Lorraine A. Weinberger
*Assistant Examiner*—E. Jane Skelly
*Attorney, Agent, or Firm*—Joseph G. Kolodny; Edward McC. Roberts; Prabodh I. Almaula

[57] ABSTRACT

The present invention provides a new process for the nitration of aromatic compounds, wherein the nitration is carried out with concentrated nitric acid, nitrogen oxides, acetyl nitrate, or a mixture of concentrated nitric acid and acetic acid, sulphuric acid or acetic anhydride, in the presence of a dipolar aprotic solvent that is inert towards the nitrating agent, and wherein the reaction is halted by diluting the mixture with the dipolar aprotic solvent after the desired degree of nitration has been attained.

7 Claims, No Drawings

PROCESS FOR THE NITRATION OF AROMATIC COMPOUNDS

The nitration of aromatic compounds is one of the most important and most widely researched of large-scale industrial reactions and a large number of processes are known. The customary nitrating agents used herein are for example: mixtures of nitric and sulphuric acid, concentrated nitric acid, mixtures of nitric acid and acetic acid or acetic anhydride, nitrogen oxides.

Normally the compound to be nitrated is treated direct with the nitrating agent. The following problems arise in this connexion:

— The nitration is difficult to control. Aromatic compounds with several nitratable positions give rise to the formation of dinitro and polynitro products. Furthermore, the danger of overnitration is a safety problem, for explosive compounds may be formed.

— The nitrated products have to be isolated before they can be further processed. This is generally done by pouring the nitration mixture on water and ice, when there occur substantial amounts of dilute aqueous acids the processing of which is uneconomic. These waste acids constitute an ecological problem.

— During the nitration, especially with nitrosulphuric acid, there often occur by-products that contain hydroxyl groups.

The present invention provides a new process for the nitration of aromatic compounds by means of which it is possible to overcome the disadvantages mentioned hereinabove. This process consists in carrying out the nitration with concentrated nitric acid, nitrogen oxides, acetyl nitrate, or a mixture of concentrated nitric acid and acetic acid, acetic anhydride or sulphuric acid, optionally in the presence of a dipolar aprotic solvent that is inert towards the nitrating agent, and in halting the reaction by diluting the mixture with the dipolar aprotic solvent after the desired degree of nitration has been reached.

The new process makes it possible to dispense with the previous troublesome processing. Without causing any overnitration, the excess of nitric acid can be distilled off direct from the reaction mixture. The formation of waste acid is thereby prevented and the consumption of nitric acid is limited to the amount required for the reaction. The process therefore offers both economic as well as ecological advantages. The product remains in the solvent and can be isolated easily by distilling off the solvent. It is even possible to process the nitration product further without isolation, e.g. by reduction, chlorination, sulphonation, ammonolysis, hydrolysis etc.

A particular advantage of the process resides in the fact that the nitration can be easily halted at any time by diluting the reaction mixture with the dipolar aprotic solvent until the concentration of the nitrating agent falls below the minimum value necessary for the nitration. This method is simpler and quicker than that used up till now of pouring the nitration mixture on ice.

Finally, it is to be mentioned that the nitration in the presence of dipolar aprotic solvents leads in general to more homogeneous and purer products. When a dipolar aprotic solvent is present in the nitration mixture the isomer distribution often changes in favour of the desired reaction product.

Suitable solvents are chiefly those with a dielectric constant of over 30 and a boiling point over 80°C. It goes without saying that they must be inert towards the nitrating agents. Particularly suitable are low molecular sulphones of the formula $$R_1 - SO_2 - R_2$$

or

wherein $R_1$ and $R_2$ each represents a straight or branched alkyl group with one to four carbon atoms or a phenyl group that is optionally substituted with low molecular alkyl, halogen or nitro, and X represents a straight or branched hydrocarbon chain with four to 10 carbon atoms which is optionally substituted with halogen or acetoxy. Halogen is to be understood as meaning fluorine, bromine and above all chlorine, and the term "low molecular" denotes radicals with one to four carbon atoms. As examples of such compounds there may be cited:

Dialkylsulphones:
dimethyl sulphone, methylethyl sulphone, diethyl sulphone, methyl-n-propyl sulphone, methylisopropyl sulphone, methyl-n-butyl sulphone, ethylisobutyl sulphone, methyl-(1-methylbutyl)-sulphone, diisopropyl sulphone, etc.

Alkylenesulphones:
tetramethylene sulphone, 3-methyl-tetramethylene sulphone, pentamethylene sulphone, hexamethylene sulphone, etc.

Sulphonyl Compounds:
bis-(methylsulphonyl)methane, bis-(ethylsulphonyl)methane, bis-(ethylsulphonyl)dimethylmethane, etc.

Preferably tetramethylene sulphone or dimethyl sulphone is used. As compounds that can be nitrated by the process according to the invention there may be cited:

Aromatic Compounds:
benzene, naphthalene, anthracene, anthraquinone, phenanthrene, penanthrenequinone, and their derivatives substituted with low molecular alkyl radicals, halogen, nitro, lower alkylsulphonyl, N,N-dialkylsulphonamide or alkoxycarbonyl groups, and also higher, condensed hydrocarbons and quinines, such as perylene, dibenzpyrene, benzanthrone, anthanthrone, pyranthrone, dibenzoypyrenequinone, dibenzanthrone, etc.

Suitable nitrating agents are nitric acid in a concentration of 90–100 %, nitrogen oxides ($N_2O_4$), acetyl nitrate, or mixtures of nitric acid with acetic acid, acetic anhydride, or sulphuric acid. 98 to 100 % nitric acid is preferred.

If 98–100 % nitric acid is used as nitrating agent, it is advantageous to use it in a 2 to 100-fold, preferably 10 to 40-fold, excess. The dipolar aprotic solvent can be present in a limited amount during the nitration itself, by which means it is often possible to attain a desired change in the isomer ratio, or it can be added only to bring the reaction to a halt. As addition to the nitration mixture there are advantageously amounts of up to 10 times the weight of the substance to be nitrated. However, the dipolar solvent may not lower the concentration of the nitrating agent too greatly. Thus, for example, when using nitric acid the acid concentration should not fall below at least 40 to 50 %. The mixture should be further diluted only to halt the reaction. The amount of solvent required for this purpose depends on the concentration of the nitrating agent in the reaction mixture. If the nitration is carried out with nitric acid, then the degree of dilution is advantageously such that the acid concentration falls below 40 %. In general, at least twice the weight of the solvent is necessary (based on the substance to be nitrated); there is no firm upper limit, but for economic reasons unecessarily large amounts will not be used. The excess nitric acid is subsequently distilled off from the mixture. Virtually the entire excess acid is thus recovered and can be used again direct or in increased concentration in a succeeding operation. The reaction product can be isolated from the residual solution by distilling off the solvent, and in doing so the solvent is also recovered in virtually quantitive amount. Of course it is also possible to precipitate the product (e.g. by addition of water), but the processing and recoverey of the solvent is thereby rendered more troublesome. In most cases it is even possible to process further the solution of the reaction product (e.g. in the sulphone as solvent, so that isolation of the product can be entirely dispensed with, e.g. in the case of further reactions with chlorine, alkalihydroxides etc. or by reducing processes. Particular importance attaches to the nitration of anthraquinone in the presence of dipolar aprotic solvents. Hitherto, anthraquinone has in general been nitrated in a mixture of sulphuric and nitric acid, whereby mixtures of products were obtained, the separation of which is most cases was not feasible technically (vid. S. Coffey, Chemistry and Industry, 1953, p. 1070).

The surprising discovery has now been made that when nitrating anthraquinone with concentrated nitric acid in the presence of a sulphone as solvent, the amount of 1-nitroanthraquinone is much greater than that obtained in the conventional process. The process according to the invention yields reaction mixtures which consists of up to over 95 % of 1-nitroanthraquinone and unreacted anthraquinone. These are highly suitable for the manufacture of 1-aminoanthraquinone, which is an important intermediate for dyestuff manufcture. The new process therefore provides a possibility of obtaining 1-aminoanthraquinone by means of a method which is economic and satisfying from the ecological standpoint and wherein it is possible to dispense with the anthraquinone-1-sulpho acid hitherto used as starting material, in the manufacture of which mercury is required. Advantageously, the nitration is carried out by reacting 1 mole of anthraquinone with 2 to 100, preferably 10 to 40, moles of concentrated, preferably 98–100 %, nitric acid, and optionally in the presence of up to the 3-fold weight, based on the amount of anthraquinone, or of up to the 0.7-fold weight, based on the amount of nitric acid, of the sulphone used as solvent. The process is carried out preferably at temperatures between −40° to +80°C, so that the desired degree of nitration is attained in a few hours or even minutes.

The reaction can be carried out both isothermically and adiabatically, it being possible to add the reactants in varying sequence. Various modifications of carrying out the process thereby results, for example:

— The anthraquinone is added to nitric acid, the mixture is heated, reacted isothermically to the desired degree of reaction, and the reaction is then discontinued by addition of the solvent.

— The anthraquinone is added to nitric acid, reacted adiabatically and the reaction is discontinued at the desired degree of reaction by addition of the solvent.

— The anthraquinone is added to a mixture of nitric acid and solvent, the mixture is reacted isothermically or adiabatically to the desired degree of reaction, and the reaction is then discontinued by addition of further amounts of solvent.

— The anthraquinone is added to the solvent and the reaction is carried out isothermically or adiabatically by addition of nitric acid.

— The anthraquinone is added to the nitric acid at relatively low temperature (when reaction either does not take place or occurs only very slowly), then the solvent is passed in adiabatically. The nitration is accelerated first by the rise in temperature (heat of mixing of the nitric acid with the solvent), later slowed down by increasing the amount of solvent, and brought to a halt. In this method the rate of addition must be programmed exactly to the desired degree of reaction.

The above examples for carrying out the reaction are not intended to be in any way limitative thereof.

In order to avoid as far as possible the formation of dinitroanthraquinone it is possible to discontinue the reaction at incomplete, e.g. 30 to 90 %, reaction of the anthraquinone. However, the preferred formation of 1-nitroanthraquinone according to the present invention also makes it possible to convert all the anthraquinone into nitroanthraquinones, without obtaining any substantial amount of dinitroanthraquiones.

The reaction is discontinued by diluting the reaction mixture with a further amount of solvent until the concentration of nitric acid falls below 40 %. In general there is required once again at least the two-fold amount (based on the amount of anthraquinone) of solvent. Preferably tetramethylene sulphone or dimethyl sulphone is used as solvent. The excess nitric acid is distilled off after the nitration has been discontinued. The residual solution containing principally 1-nitroanthraquinone and unreacted anthraquinone can be used direct for further reactions, e.g. for the manufacture of 1-aminoanthraquinone. However, it is also possible to isolate the reaction product by removing the sulphone by means of vacuum distillation or by precipitating and filtering it off.

In analogous manner it is also possible to nitrate selectively e.g. 2,3-dimethyl-anthraquinone or anthraquinones that are substituted with chlorine or nitro groups.

The following Examples illustrate the invention, the parts and percentages being by weight.

EXAMPLE 1

208 parts of anthraquinone are added to a mixture of 945 parts of 100 % nitric acid and 240 parts of tetramethylene solphone. The mixture is heated to 70°C within a few minutes and after 3–5 minutes a further 760 parts of tetramethylene sulphone are added, the temperature rising to 81°C. The excess nitric acid is subsequently distilled off completely and the reaction product is isolated by removing the tetramethylene sulphone by means of vacuum distillation.

The resulting product contains about 30–50 % of unreacted anthraquinone, 50–64 % of 1-nitroanthraquinone, about 5 % of 2-nitroanthraquinone, and about 0.5 % of 1,5-dinitroanthraquinone. This product can be processed in known manner to 1-aminoanthraquinone.

EXAMPLE 2

155 parts of napthalene are added at 20°–25°C to a previously prepared mixture of 300 parts of tetramethylene sulphone and 252 parts of 100 % nitric acid. After the mixture has been stirred for ½ hour, a further 500 parts of tetramethylene sulphone are added and the excess nitric acid is distilled off at 100–120 Torr. As residue there is obtained a solution of 1-nitronaphthalene in tetramethylene sulphone in virtually quantitative yield. The product can be isolated by distilling off the tetramethylene sulphone, or it can be further processed direct in solution.

EXAMPLE 3

313 parts of previously prepared 100 % nitric acid are added at 0°C to 41.6 parts of anthraquinone. The reaction mixture is stirred for 1 hour at 0°C. Then 350 parts of tetramethylene sulphone are added, the excess nitric acid is completely distilled off, and the reaction product is isolated by removing the tetramethylene sulphone by means of vacuum distillation. The resulting product contains 20 % of unreacted anthraquinone, 74 % of 1-nitroanthraquinone, 4 % of 2-nitroanthraquinone, and 2 % of dinitroanthraquinone.

EXAMPLE 4

104 parts of anthraquinone are added to a mixture of 473 parts of 100 % nitric acid and 120 parts of dimethyl sulphone, within about 2 minutes the mixture is heated to 80°C and after 5 minutes a further 380 parts of dimethyl sulphone are added. The excess nitric acid is then completely distilled off and the reaction product is isolated by removing the dimethyl sulphone by vacuum distillation.

The resulting product (122 parts) contains 19.8 % of unreacted anthraquinone, 67.4 % of 1-nitroanthraquinone, 12.2 % of 2-nitroanthraquinone, and 0.6 % of dinitroanthraquinone. By carrying out the reaction at 70°C and under otherwise identical reaction conditions the product (117 parts) contains 28.7 % of unreacted anthraquinone, 60.2 % of 1-nitroanthraquinone, 11.0 % of 2-nitroanthraquinone, and less than 0.1 % of dinotroanthraquinones.

These products can be processed in known manner to 1-aminoanthraquinone.

EXAMPLE 5

208 parts of anthraquinone are added to a previously prepared mixture of 945 parts of 100 % nitric acid and 630 parts of tetramethylene sulphone. The reaction mixture is heated to 75°C and stirred at this temperature for 8 hours. Then 790 parts of tetramethylene sulphone are added, the excess nitric acid is completely distilled off, and the reaction product is isolated by removing the tetramethylene sulphone by vacuum distillation. The resulting product (118 parts) contains 25.7 % of unreacted anthraquinone, 62.3 % of 1-nitroanthraquinone, and 12.0 % of 2-nitroanthraquinone.

If the reaction is not discontinued by addition of solvent, then substantial amounts of dinitroanthraquinones are obtained, as the following example will show:

A previously prepared mixture of 126 parts of 100 % nitric acid, 2 parts of 100 % sulphuric acid and 6 parts of tetramethylene sulphone is heated to 35°C and at this temperature 41.6 parts of anthraquinone are added all at once. After 7 minutes the temperature has risen to 70°C, the reaction mixture is cooled, and poured into 500 parts of ice water. The precipitated product is filtered, washed neutral, and dried. If contains 10.6 % of unreacted anthraquinone, 70.1 % of 1-nitroanthraquinone, 10.7 % of 2-nitroanthraquinone, and 8.5 % of dinitroanthraquinones.

EXAMPLE 6

58.6 parts of benzene are heated to 50°C and within 15 minutes there is added dropwise at this temperature a mixture of 47.3 parts of 99.5 % nitric acid and 20.3 parts of tetramethylene sulphone. The batch is stirred for 30 minutes. The reaction of benzene to nitrobenzene is 42 %. Further nitration is completely halted by addition of a further 169 parts of tetramethylene sulphone. No by-products are obtained.

We claim:

1. A process for the nitration of unsubstituted or substituted benzene, napthalene, anthracene, anthraquinone, phenanthrene, phenanthrenequinone, wherein the substituents are selected from the group consisting of lower alkyl, halo, nitro, lower alkylsulphonyl, lower N,N-dialkylsulphonamide or lower alkoxycarbonyl; or perylene, dibenzpyrene, benzanthrone, anthranthrone, pyanthrone, dibenzopyrenequinone or dibenzanthrone wherein the nitration is carried out at a temperature of −40°C to +80°C with 90 to 100% nitric acid, nitrogen oxides, acetylnitrate, or a mixture of said nitric acid and acetic acid, sulfuric acid or acetic anhydride, in a dipolar aprotic solvent that is inert towards the nitrating agent and has a boiling point over 80°C and has a dielectric constant of over 30, the amount of aprotic solvent present being at most 50% by weight of the reaction mixture, wherein the reaction is halted by addition to the mixture of additional sufficient amount of said dipolar aprotic solvent, after the desired degree of nitration has been attained.

2. A process of claim 1, wherein the solvent of the formula

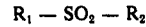

or

in which $R_1$ and $R_2$ each represents a straight or branched alkyl of one to four carbon atoms or a phenyl or a phenyl substituted with lower alkyl, hydrogen or nitro, and X represents a straight or branched hydrocarbon chain of four to 10 carbon atoms or a straight or branched hydrocarbon chain of four to 10 carbon atoms substituted with halogen or acetoxy.

3. A process according to claim 1, wherein tetramethylene sulphone or dimethyl sulphone is used as solvent.

4. A process according to claim 1, wherein the reaction is halted by adding a sufficient amount of the solvent to the nitration mixture so that the concentration of the nitric acid falls below 40 %.

5. A process according to claim 1, wherein the excess nitric acid is distilled off after the nitration has been halted.

6. A process according to claim 1, wherein anthraquinone or anthraquinone that is substituted with chlorine, nitro, or lower alkyl is nitrated.

7. A process according to claim 1, wherein the nitration is halted at a nitration degree of 30 to 100% by addition to the reaction mixture of a sufficient amount of the claimed solvents.

\* \* \* \* \*